(12) United States Patent
Tao et al.

(10) Patent No.: US 12,293,021 B2
(45) Date of Patent: May 6, 2025

(54) VIRTUAL HAPTIC ASSEMBLY AND VIRTUAL HAPTIC SYSTEM

(71) Applicants: Beijing BOE Technology Development Co., Ltd., Beijing (CN); BOE Technology Group Co., Ltd., Beijing (CN)

(72) Inventors: Yongchun Tao, Beijing (CN); Yuju Chen, Beijing (CN); Yingzi Wang, Beijing (CN)

(73) Assignees: Beijing BOE Technology Development Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/040,032

(22) PCT Filed: Feb. 24, 2022

(86) PCT No.: PCT/CN2022/077763
§ 371 (c)(1),
(2) Date: Jan. 31, 2023

(87) PCT Pub. No.: WO2023/159442
PCT Pub. Date: Aug. 31, 2023

(65) Prior Publication Data
US 2024/0248536 A1    Jul. 25, 2024

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01)

(58) Field of Classification Search
CPC ............ G06F 3/01; G06F 3/016; G06F 3/041
See application file for complete search history.

(56) References Cited

U.S. PATENT DOCUMENTS

| 10,904,370 B1 | 1/2021 | Fournier et al. |
| 2016/0091972 A1 | 3/2016 | Patel et al. |
| 2018/0179051 A1 | 6/2018 | Keller et al. |
| 2020/0033946 A1 | 1/2020 | Chang et al. |

(Continued)

FOREIGN PATENT DOCUMENTS

| CN | 103336603 A | * 10/2013 |
| CN | 203311372 U | * 11/2013 |
| CN | 204965394 U | 1/2016 |

(Continued)

*Primary Examiner* — Stacy Khoo
(74) *Attorney, Agent, or Firm* — Workman Nydegger

(57) ABSTRACT

Disclosed is a virtual haptic assembly and a virtual haptic system. The virtual haptic assembly includes a display screen; an actuator on a light emitting side of the display screen, where the actuator includes a touch panel and a piezoelectric sensor, the touch panel includes a touch area and a non-touch area on at least one side of the touch area, the piezoelectric sensor is located on one side of the touch panel facing the display screen, and the piezoelectric sensor is configured to drive the touch panel to vibrate to form haptic feedback in response to interactive information of a user; and a first cushion, fixed between the display screen and the actuator, where an orthographic projection of the first cushion on the touch panel is located in the non-touch area.

20 Claims, 14 Drawing Sheets

(56) References Cited

U.S. PATENT DOCUMENTS

2021/0286430 A1    9/2021  Schwab et al.
2022/0182743 A1 *  6/2022  Nam ..................... B60K 35/00

FOREIGN PATENT DOCUMENTS

| CN | 207869340 | U |   | 9/2018  |         |            |
|----|-----------|---|---|---------|---------|------------|
| CN | 108845710 | A |   | 11/2018 |         |            |
| CN | 109036148 | A |   | 12/2018 |         |            |
| CN | 109689420 | A |   | 4/2019  |         |            |
| CN | 109923676 | A | * | 6/2019  | ........... | G09G 3/035 |
| CN | 110162198 | A |   | 8/2019  |         |            |
| CN | 211062026 | U |   | 7/2020  |         |            |
| CN | 212364961 | U |   | 1/2021  |         |            |
| EP | 1450247   | A1 |  | 8/2004  |         |            |
| WO | WO-2012067370 | A2 | * | 5/2012 | ........... | G06F 1/1684 |
| WO | WO-2021003640 | A1 | * | 1/2021 | .......... | G06F 3/0412 |
| WO | WO-2023076246 | A1 | * | 5/2023 |         |            |

* cited by examiner

VIRTUAL HAPTIC ASSEMBLY AND VIRTUAL HAPTIC SYSTEM

CROSS REFERENCE TO RELATED APPLICATIONS

This application is a national phase entry under 35 U.S.C. § 371 of International Application No. PCT/CN2022/077763, filed on Feb. 24, 2022, the entire content of which is incorporated herein by reference.

FIELD

The disclosure relates to the field of haptic interaction technology, in particular to a virtual haptic assembly and a virtual haptic system.

BACKGROUND

The human body has senses of sight, sound, touch and the like, while techniques of sight and sound for present sensing and presentation are relatively mature. For example, cameras are used for image collection, display screens and other display devices are used for image presentation, silicon microphones, electret microphones, piezoelectric microphones and other devices are used for collection of sound signals in the environment, and earphones and stereos based on the principles of static electricity, dynamic coil, piezoelectricity, etc. are used for various wonderful sounds play.

For a haptic system, the mechanism is relatively complex, which relates to sensing of materials, roughness, friction, temperature characteristics, size, quality and other physical signals, the research and industrialization are relatively late. With the large-scale application of early resistive touch panels to current capacitive touch panels and the demand for virtual reality and other application scenarios, people have urgent demands for tactile perception and tactile representation.

SUMMARY

Embodiments of the disclosure provide a virtual haptic assembly and a virtual haptic system, and a specific solution is as follows.

In an aspect, an embodiment of the disclosure provides a virtual haptic assembly, including:
 a display screen;
 an actuator, located on a light emitting side of the display screen, where the actuator includes a touch panel and a piezoelectric sensor, and the touch panel includes a touch area and a non-touch area located on at least one side of the touch area; the piezoelectric sensor is located on one surface of the touch panel facing the display screen, and the piezoelectric sensor is configured to drive the touch panel to vibrate together to form haptic feedback in response to interactive information of a user; and
 a first cushion, fixed between the display screen and the actuator, where an orthographic projection of the first cushion on the touch panel is located in the non-touch area.

In some embodiments, in the above virtual haptic assembly provided by the embodiment of the disclosure, the first cushion is located on a surface of each corner of the touch panel.

In some embodiments, in the above virtual haptic assembly provided by the embodiment of the disclosure, the touch panel is a polygon, the first cushion has a fixed shape, and the first cushion is arranged symmetrically with respect to a center of the touch panel.

In some embodiments, in the above virtual haptic assembly provided by the embodiment of the disclosure, the fixed shape is an L shape, a rectangle or a triangle.

In some embodiments, in the above virtual haptic assembly provided by the embodiment of the disclosure, the first cushion is arranged enclosing the touch area.

In some embodiments, in the above virtual haptic assembly provided by the embodiment of the disclosure, an orthographic projection of the piezoelectric sensor on the touch panel is located in the touch area.

In some embodiments, in the above virtual haptic assembly provided by the embodiment of the disclosure, the piezoelectric sensor is arranged all over the touch area.

In some embodiments, in the above virtual haptic assembly provided by the embodiment of the disclosure, an orthographic projection of the piezoelectric sensor on the touch panel is located in the non-touch area.

In some embodiments, in the above virtual haptic assembly provided by the embodiment of the disclosure, a plurality of piezoelectric sensors are provided and divided into at least one group, and each piezoelectric sensor in the same group is arranged in the non-touch area on the same side of the touch area.

In some embodiments, in the above virtual haptic assembly provided by the embodiment of the disclosure, the piezoelectric sensors form one group, and the piezoelectric sensors in the group are arranged in the non-touch area on one side of the touch area.

In some embodiments, in the above virtual haptic assembly provided by the embodiment of the disclosure, the piezoelectric sensors are divided into two groups, and the piezoelectric sensors in the two groups are arranged in the non-touch areas on two sides of the touch area respectively.

In some embodiments, the above virtual haptic assembly provided by the embodiment of the disclosure further includes: a first wire and a second wire, where the first wire and the second wire are located on one sides of the piezoelectric sensors facing the display screen; the first wire is connected with a first electrode of each piezoelectric sensor in the same group, and the first wire is not in contact with the piezoelectric sensors at positions other than connection points with the piezoelectric sensors; and the second wire is connected with a second electrode of each piezoelectric sensor in the same group, and the second wire is not in contact with the piezoelectric sensors at positions other than connection points with the piezoelectric sensors.

In some embodiments, in the above virtual haptic assembly provided by the embodiment of the disclosure, between the connection points of two adjacent piezoelectric sensors in the same group, the first wire extends obliquely towards a position between the two connection points, and then extends in parallel to an arrangement direction of the piezoelectric sensors.

In some embodiments, the above virtual haptic assembly provided by the embodiment of the disclosure further includes: a assembly cover plate, and the assembly cover plate is located on one side of the actuator away from the display screen; and the assembly cover plate includes a first hollowed-out structure, and an orthographic projection of the first hollowed-out structure on the touch panel approximately coincides with the touch area.

In some embodiments, the above virtual haptic assembly provided by the embodiment of the disclosure further includes: a second cushion, the second cushion is fixed between the assembly cover plate and the touch panel, and an orthographic projection of the second cushion on the touch panel is located in the non-touch area.

In some embodiments, the above virtual haptic assembly provided by the embodiment of the disclosure further includes a assembly mounting bottom plate, and the assembly mounting bottom plate is located on one side of the display screen away from the actuator; the assembly mounting bottom plate includes a first body part and a plurality of first protruding parts located on a side surface of the first body part, where an orthographic projection of the first body part on the touch panel approximately coincides with the touch panel, and orthographic projections of the plurality of first protruding parts on the touch panel do not overlap the touch panel; and the assembly cover plate includes a second body part and a plurality of second protruding parts located on a side surface of the second body part, where an orthographic projection of the second body part on the touch panel approximately coincides with the non-touch area, and the second protruding parts are fixedly connected with the first protruding parts.

In some embodiments, the above virtual haptic assembly provided by the embodiment of the disclosure further includes: a display drive board and a touch drive board, where the display drive board and the touch drive board are located on one side of the assembly mounting bottom plate away from the display screen, the display drive board is electrically connected with the display screen, and the touch drive board is electrically connected with the actuator.

In another aspect, an embodiment of the disclosure provides a virtual haptic system, applied to a vehicle, and including a steering wheel housing and the above virtual haptic assembly provided by the embodiment of the disclosure, and the virtual haptic assembly is mounted in the steering wheel housing.

In some embodiments, in the above virtual haptic system provided by the embodiment of the disclosure, a center of the steering wheel housing has a first groove, and the virtual haptic assembly is embedded in the first groove.

In some embodiments, the above virtual haptic system provided by the embodiment of the disclosure further includes a first cover plate and a third cushion, where the first cover plate includes a second hollowed-out structure, a third body part and a first annular groove, an orthographic projection of the second hollowed-out structure on the touch panel approximately coincides with the touch area, the third body part encloses the second hollowed-out structure and is fixedly connected with the steering wheel housing, the first annular groove is located on a side surface of the third body part away from the second hollowed-out structure, and the third cushion is embedded between the first annular groove and the virtual haptic assembly.

In some embodiments, the above virtual haptic system provided by the embodiment of the disclosure further includes a first main controller and a first power supply, a bottom of the first groove includes a first wiring through hole, and the first main controller and the first power supply are electrically connected with the virtual haptic assembly through the first wiring through hole respectively.

In some embodiments, the above virtual haptic system provided by the embodiment of the disclosure further includes: a first box body and a first box body upper cover which are detachably connected, where the first box body includes a second wiring through hole, the second wiring through hole and the first wiring through hole are connecting, a first accommodation space is formed between the first box body and the first box body upper cover, and the first main controller and the first power supply are arranged in the first accommodation space.

In some embodiments, in the above virtual haptic system provided by the embodiment of the disclosure, the first box body includes a first power switch and a first power interface.

In some embodiments, the above virtual haptic system provided by the embodiment of the disclosure further includes a rotating shaft, and the rotating shaft is connected with the steering wheel housing and the first box body.

In some embodiments, in the above virtual haptic system provided by the embodiment of the disclosure, the rotating shaft includes an upper rotating shaft, a lower rotating shaft, a mounting pad and a third wiring through hole, the upper rotating shaft is fixedly connected with the steering wheel housing, the lower rotating shaft is fixedly connected with the first box body, the mounting pad is located between the upper rotating shaft and the lower rotating shaft, the third wiring through hole penetrates through the upper rotating shaft, the mounting pad and the lower rotating shaft, and the third wiring through hole communicates with the first wiring through hole and the second wiring through hole.

In some embodiments, the above virtual haptic system provided by the embodiment of the disclosure further includes a first counterweight, the first counterweight is located in the first accommodation space, and the first counterweight is fixedly provided with the first main controller and the first power supply.

In some embodiments, in the above virtual haptic system provided by the embodiment of the disclosure, the steering wheel housing includes a rim, a spoke and a hub, the hub is arranged in the rim, the spoke is fixedly connected between the hub and the rim, and a center of the hub has the first groove.

In some embodiments, in the above virtual haptic system provided by the embodiment of the disclosure, the shape of the rim is an annulus.

In some embodiments, in the above virtual haptic system provided by the embodiment of the disclosure, the annulus is a circular ring; the annulus is formed by connecting a line segment and a major arc end to end; or, the annulus is formed by two line segments and two minor arcs, and the line segments and the minor arcs are connected alternately.

In some embodiments, in the above virtual haptic system provided by the embodiment of the disclosure, the shape of the rim is a non-closed pattern.

In some embodiments, in the above virtual haptic system provided by the embodiment of the disclosure, the non-closed pattern is formed by a line segment and two minor arcs, and the line segment is connected between the two minor arcs.

In another aspect, an embodiment of the disclosure provides a virtual haptic system, applied to a non-steering wheel scene, and including the above virtual haptic assembly provided by the embodiment of the disclosure.

In some embodiments, the above virtual haptic system provided by the embodiment of the disclosure further includes a housing, the housing includes a second groove, and the virtual haptic assembly is embedded in the second groove.

In some embodiments, the above virtual haptic system provided by the embodiment of the disclosure further includes a second cover plate and a fourth cushion, where the second cover plate includes a third hollowed-out structure, a fourth body part and a second annular groove, an orthographic projection of the third hollowed-out structure on the touch panel approximately coincides with the touch area, the fourth body part encloses the third hollowed-out structure and is fixedly connected with the housing, the second annular groove is located on a side surface of the fourth body part away from the third hollowed-out structure, and the fourth cushion is embedded between the second annular groove and the virtual haptic assembly.

In some embodiments, the above virtual haptic system provided by the embodiment of the disclosure further includes a second main controller and a second power supply, a bottom of the second groove includes a fourth wiring through hole, and the second main controller and the second power supply are electrically connected with the virtual haptic assembly through the fourth wiring through hole respectively.

In some embodiments, the above virtual haptic system provided by the embodiment of the disclosure further includes: a second box body and a second box body upper cover which are detachably connected, wherein the second box body is fixedly connected with the housing, the second box body includes a fifth wiring through hole, the fifth wiring through hole and the fourth wiring through hole are connecting, a second accommodation space is formed between the second box body and the second box body upper cover, and the second main controller and the second power supply are arranged in the second accommodation space.

In some embodiments, in the above virtual haptic system provided by the embodiment of the disclosure, the second box body includes a second power switch and a second power interface.

In some embodiments, the above virtual haptic system provided by the embodiment of the disclosure further includes a second counterweight, the second counterweight is located in the second accommodation space, and the second counterweight is fixedly provided with the second main controller and the second power supply.

DETAILED DESCRIPTION

Figure 1:
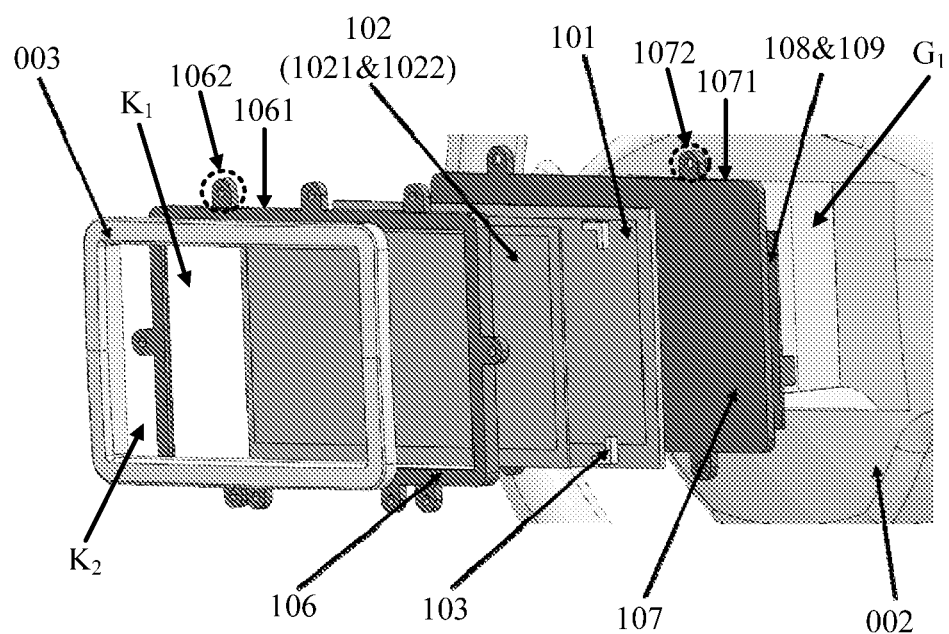
FIG. 1 is a schematic diagram of a virtual haptic assembly provided by an embodiment of the disclosure.

To make objectives, technical solutions and advantages of embodiments of the disclosure clearer, the technical solutions of the embodiments of the disclosure will be clearly and completely described below in conjunction with the accompanying drawings of the embodiments of the disclosure. It needs to be noted that the sizes and shapes of all figures in the accompanying drawings do not reflect true scales, and are only intended to schematically illustrate the content of the disclosure. The same or similar reference numerals represent the same or similar elements or elements with the same or similar functions all the time.

Unless otherwise defined, technical or scientific terms used herein shall have the ordinary meanings understood by those ordinarily skilled in the art to which the disclosure pertains. The words "first", "second" and the similar words used in specification and claims of the disclosure do not indicate any order, quantity or importance, but are only used to distinguish different components. The words "comprise" or "include" and the like indicate that an element or item appearing before such the word covers listed elements or items appearing after the word and equivalents thereof, and do not exclude other elements or items. "Inner", "outer", "upper" and "lower" and the like are only used to represent relative position relationships, and the relative position relationships may also change accordingly after an absolute position of a described object is changed.

In the related art, a virtual haptic assembly realizes haptic feedback through actuator vibration, but an actuator is prone to being in contact and friction with other components (such as a display screen) during vibration to generate noise, which affects the haptic experience effect.

Figure 2:
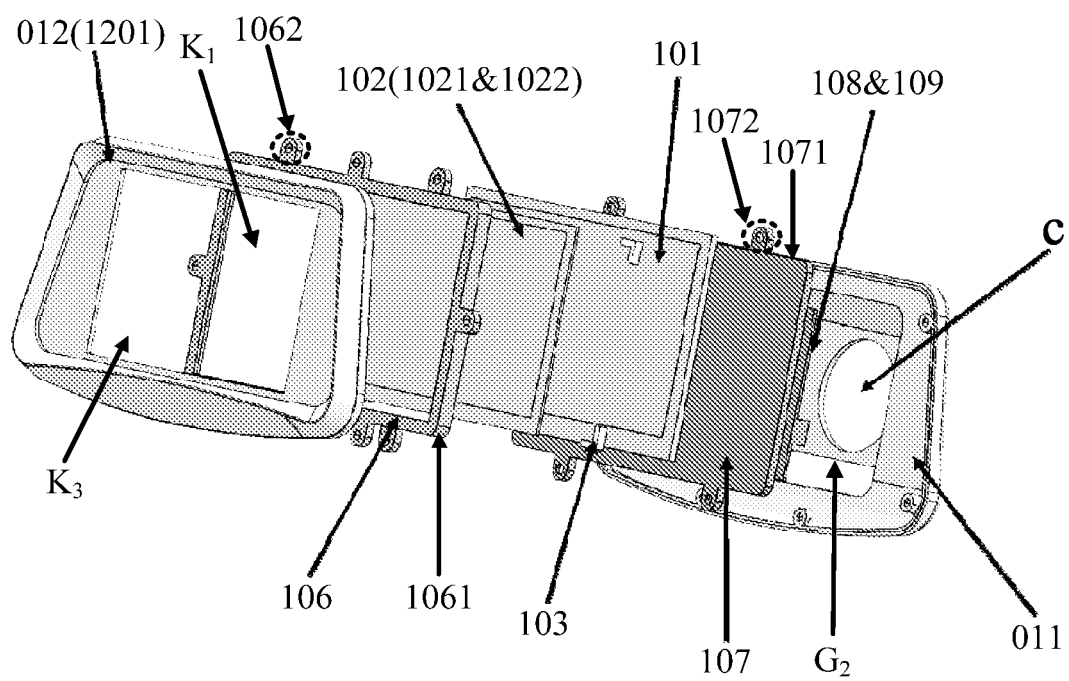
FIG. 2 is another schematic diagram of a virtual haptic assembly provided by an embodiment of the disclosure.
Figure 3:
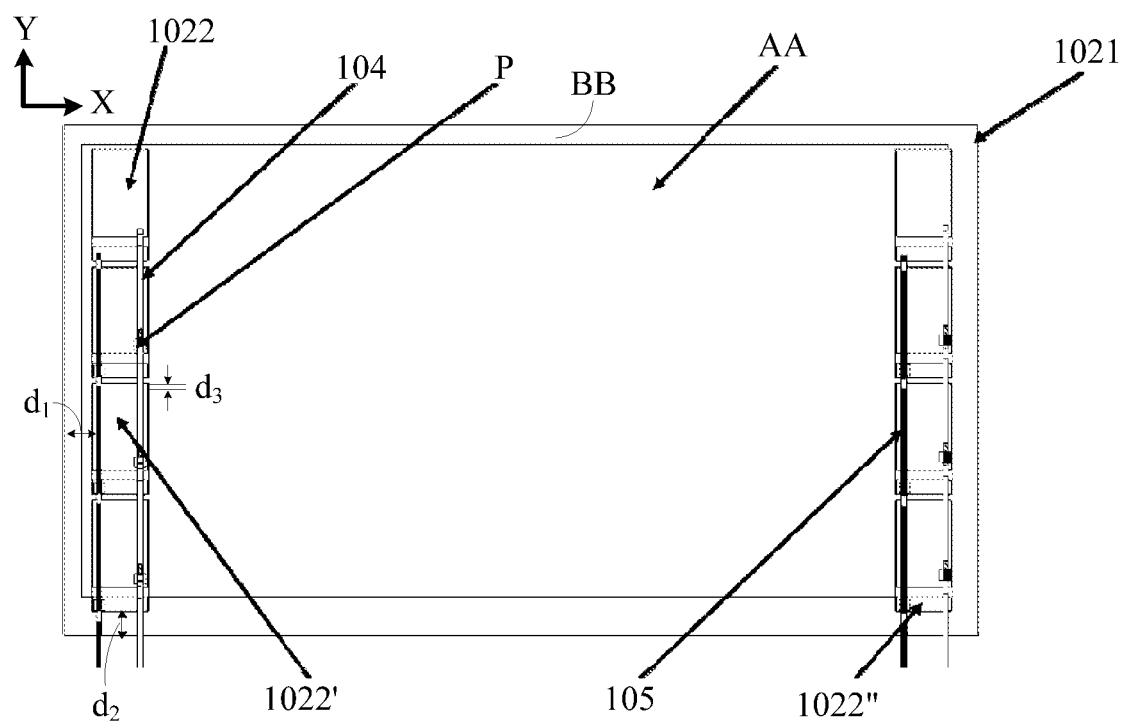
FIG. 3 is a schematic diagram of an actuator provided by an embodiment of the disclosure.

In order to improve the above technical problems existing in the related art, an embodiment of the disclosure provides a virtual haptic assembly, as shown in FIG. 1 to FIG. 3, including:

a display screen 101; optionally, the display screen 101 may be a liquid crystal display (LCD), an organic light emitting display (OLED), a quantum dot light emitting display (QLED), a micro/mini light emitting display (micro/mini LED) and the like;

an actuator 102, located on a light emitting side of the display screen 101, where the actuator 102 includes a touch panel 1021 and a piezoelectric sensor 1022, the touch panel 1021 includes a touch area AA (which may be used as a human-computer interactive interface) and a non-touch area BB located on at least one side of the touch area AA; the piezoelectric sensor 1022 is located on a side of the touch panel 1021 facing the display screen 101, and the piezoelectric sensor 1022 is configured to drive the touch panel 1021 to vibrate to form haptic feedback in response to interactive information from a user; and a first cushion 103, fixed between the display screen 101 and the actuator 102, where an orthographic projection of the first cushion 103 on the touch panel 1021 is located in the non-touch area BB, and optionally, the first cushion 103 may be made of soft glue and other materials.

In the above virtual haptic assembly provided by the embodiment of the disclosure, the first cushion 103 is adopted to fix the display screen 101 and the actuator 102, so that there is a certain distance between the actuator 102 and the display screen 101, which avoids the noise generated by friction between the actuator 102 and the display screen 101 when the actuator 102 vibrates, and user experience is improved. Moreover, since the first cushion 103 has a soft characteristic and is located in the non-touch area BB, the vibration of the piezoelectric sensor 1022 in the touch area AA may not be greatly constrained, so that it is ensured that the actuator 102 can vibrate in a free state as much as possible, that is, the strength of the haptic feedback can be effectively ensured without reducing a vibration amplitude of the actuator 102.

In some embodiments, in the above virtual haptic assembly provided by the embodiment of the disclosure, as shown in FIG. 1 and FIG. 2, the first cushion 103 may be located on a surface of each corner of the touch panel 1021, the first cushion 103 may be in a fixed shape (such as an L-shape, a triangle and a rectangle), the touch panel 1021 may be a polygon (such as a rectangle), and the first cushion 103 may be arranged symmetrically with respect to a center of the touch panel 1021, so as to realize a good supporting and fixing effect on the touch panel 1021. Optionally, the first cushion 103 may further be arranged as a whole circle enclosing the touch area AA. In some embodiments, the first cushion 103 may further have other shapes, such as a circle, except the L-shape, the triangle and the rectangle; the touch panel 1021 may also have other shapes, such as a trapezoid and a regular polygon, except the rectangle; and the position and quantity of the first cushion 103 are not limited to the above settings, which may be flexibly arranged according to the noise reduction and fixing effects.

In some embodiments, in the above virtual haptic assembly provided by the embodiment of the disclosure, an orthographic projection of the piezoelectric sensor 1022 on the touch panel 1021 may be located in the touch area AA. Exemplarily, the piezoelectric sensor 1022 may be arranged in the touch area AA all over the whole-surface, so as to enhance the haptic feedback effect.

In some embodiments, in the above virtual haptic assembly provided by the embodiment of the disclosure, the orthographic projection of the piezoelectric sensor 1022 on the touch panel 1021 may be located in the non-touch area BB. In some embodiments, a plurality of piezoelectric sensors 1022 may be provided and divided into at least one group, and each piezoelectric sensor 1022 in the same group is located in the non-touch area BB at the same side of the touch area AA. For example, the piezoelectric sensors 1022 may be divided into one group, the piezoelectric sensors 1022 in the group may be arranged in the non-touch area BB at one side of the touch area AA, for example, they may be located in the non-touch area BB at any one of upper, lower, left and right sides of the touch area AA in FIG. 1. For another example, the plurality of piezoelectric sensors 1022 may be divided into two groups, the piezoelectric sensors 1022 in the two groups may be located in the non-touch areas BB at two sides of a short side direction Y of the touch area AA respectively (namely, the non-touch areas BB on left and right sides of the touch area AA in FIG. 3), that is, the piezoelectric sensors 1022 are not arranged on the non-touch areas BB at two sides of a long side direction X of the touch area AA (namely, the non-touch areas BB on upper and lower sides of the touch area AA in FIG. 3). Compared with arranging the two groups of piezoelectric sensors 1022 in the non-touch areas BB on the two sides of the long side direction X of the touch area AA, the quantity of the piezoelectric sensors 1022 and costs can be reduced while the equal touch feedback experience is ensured.

Optionally, a size of the touch panel 1021 may be (50-220) mm*(30-180) mm, such as 166 mm*100 mm. The piezoelectric sensor 1022 may be bonded to the touch panel 1021 with a hard glue, and a transverse distance $d_1$ between the piezoelectric sensor 1022 and left and right edges of the touch panel 1021 is 2 mm-10 mm, such as 5 mm; a longitudinal distance $d_2$ between the piezoelectric sensor 1022 and upper and lower edges of the touch panel 1021 is 1 mm-7.5 mm, such as 4.5 mm; and in each group of piezoelectric sensors 1022, a distance $d_3$ between two adjacent piezoelectric sensors 1022 is 0.2 mm-5 mm, such as 1 mm.

Figure 4:
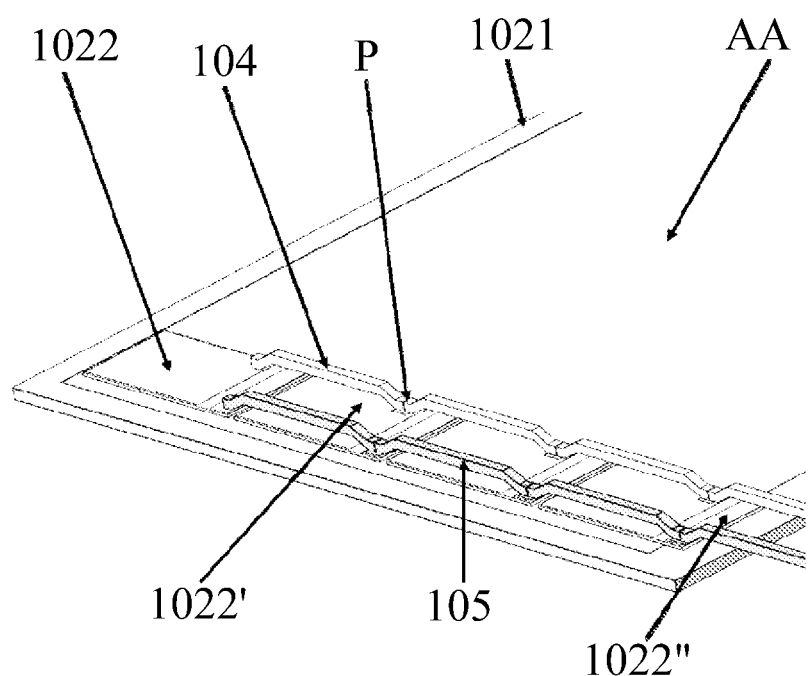
FIG. 4 is a partial enlarged view of the actuator shown in FIG. 3.

In some embodiments, the above virtual haptic assembly provided by the embodiment of the disclosure, as shown in FIG. 3 and FIG. 4, may further include: a first wire 104 and a second wire 105, where the first wire 104 and the second wire 105 are located on a side of the piezoelectric sensor 1022 facing the display screen 101; the first wire 104 is connected with a first electrode 1022' of each piezoelectric sensor 1022 in the same group, and the first wire 104 is not in contact with the piezoelectric sensors 1022 at positions other than connection points P with the piezoelectric sensors 1022; and the second wire 105 is connected with a second electrode 1022" of each piezoelectric sensor 1022 in the same group, and the second wire 105 is not in contact with the piezoelectric sensors 1022 at positions other than connection points P with the piezoelectric sensors 1022. As such, the first electrode 1022' of each piezoelectric sensor 1022 in the same group is led out by the first wire 104, and the second electrode 1022" of each piezoelectric sensor 1022 in the same group is led out by the second wire 105. Also, the first wire 104 and the second wire 105 may be not in contact with the piezoelectric sensors 1022 at positions other than the connection points P, thus avoiding the noise generated by friction between the actuator 102 and the first wire 104 as well as the second wire 105 when the actuator 102 vibrates.

In some embodiments, in the above virtual haptic assembly provided by the embodiment of the disclosure, as shown in FIG. 4, between the connection points P of two adjacent piezoelectric sensors 1022 in the same group, the first wire 104 extends obliquely towards a position between the two connection points P, and then extends in parallel to an arrangement direction (such as the short side direction Y of the touch area AA) of the piezoelectric sensors 1022, that is, between the two adjacent connection points P, the wire and the piezoelectric sensors 1022 enclose a regular trapezoid. Optionally, the first wire 104 and the second wire 105 are welded together with the piezoelectric sensors 1022 by using a hard single core wire in same material (such as a copper wire), the wire at a welding point (namely the connection point P) is slightly titled (such as 0.05 mm-5 mm away from the piezoelectric sensors 1022) and extends obliquely, and extends in parallel to the arrangement direction of the piezoelectric sensors 1022 outside the welding point without being in contact with the piezoelectric sensors 1022.

In some embodiments, the above virtual haptic assembly provided by the embodiment of the disclosure, as shown in FIG. 1 and FIG. 2, may further include: a assembly cover plate 106, located on a side of the actuator 102 away from the display screen 101. The assembly cover plate 106 includes a first hollowed-out structure $K_1$, an orthographic projection of the first hollowed-out structure $K_1$ on the touch panel 1021 approximately coincides with the touch area AA, so that the assembly cover plate 106 can protect the display screen 101 and the actuator 102.

It should be noted that in the embodiments provided by the disclosure, due to the limitation of process conditions or the influence of other factors such as measurement, "approximately coincide" may coincide exactly, or there may be some deviations (for example, it has a deviation of ±5 μm), so the relationship of "approximately coincide" between the relevant features, as long as the error is allowed, belongs to the scope of protection of the disclosure.

In some embodiments, the above virtual haptic assembly provided by the embodiment of the disclosure, as shown in FIG. 1 and FIG. 2, may further include: a second cushion (not shown in the figure), the second cushion is located between the assembly cover plate 106 and the touch panel 1021, and an orthographic projection of the second cushion on the touch panel 1021 is located in the non-touch area BB, for example, the second cushion may enclose the touch area AA. The existence of the second cushion prevents the assembly cover plate 106 from being in contact with the actuator 102 including the touch panel 1021, thus avoiding the vibration influence and restraint effect of the hard contact between the assembly cover plate 106 and the actuator 102 on the actuator 102, and avoiding the noise generated by the friction between the assembly cover plate 106 and the actuator 102.

In some embodiments, the above virtual haptic assembly provided by the embodiment of the disclosure, as shown in FIG. 1 and FIG. 2, may further include a assembly mounting bottom plate 107, and the assembly mounting bottom plate 107 is located on one side of the display screen 101 away from the actuator 102. The assembly mounting bottom plate 107 includes a first body part 1071 and a plurality of first protruding parts 1072 located on a side surface of the first body part 1071, where an orthographic projection of the first body part 1071 on the touch panel 1021 approximately coincides with the touch panel 1021 (that is, it exactly coincides or is within an allowable range of errors caused by factors such as manufacturing and measurement), and orthographic projections of the plurality of first protruding parts 1072 on the touch panel 1021 do not overlap the touch panel 1021. The assembly cover plate 106 includes a second body part 1061 and a plurality of second protruding parts 1062 located on a side surface of the second body part 1061, where an orthographic projection of the second body part 1061 on the touch panel 1021 approximately coincides with the non-touch area BB (that is, it exactly coincides or is within an allowable range of errors caused by factors such as manufacturing and measurement), the second protruding parts 1062 and the first protruding parts 1072 are fixedly connected together, so that the display screen 101 and the actuator 102 are accommodated between the assembly cover plate 106 and the assembly mounting bottom plate 107, and a protection effect is realized.

In some embodiments, the above virtual haptic assembly provided by the embodiment of the disclosure, as shown in FIG. 1 and FIG. 2, may further include: a display drive board 108 and a touch drive board 109, where the display drive board 108 and the touch drive board 109 are located on a side of the assembly mounting bottom plate 107 away from the display screen 101. The display drive board 108 is electrically connected with the display screen 101, the touch drive board 109 is electrically connected with the actuator 102, so as to control the display screen to display images through the display drive board 108, and haptic feedback is performed through the touch drive board 109.

Based on the same inventive concept, an embodiment of the disclosure further provides a virtual haptic system, including the above virtual haptic assembly provided by the embodiment of the disclosure. Since the principle for solving problems of the virtual haptic system is similar to that of the above virtual haptic assembly, implementation of the virtual haptic system may refer to embodiments of the above virtual haptic assembly, and repetitions are omitted herein.

Figure 5:
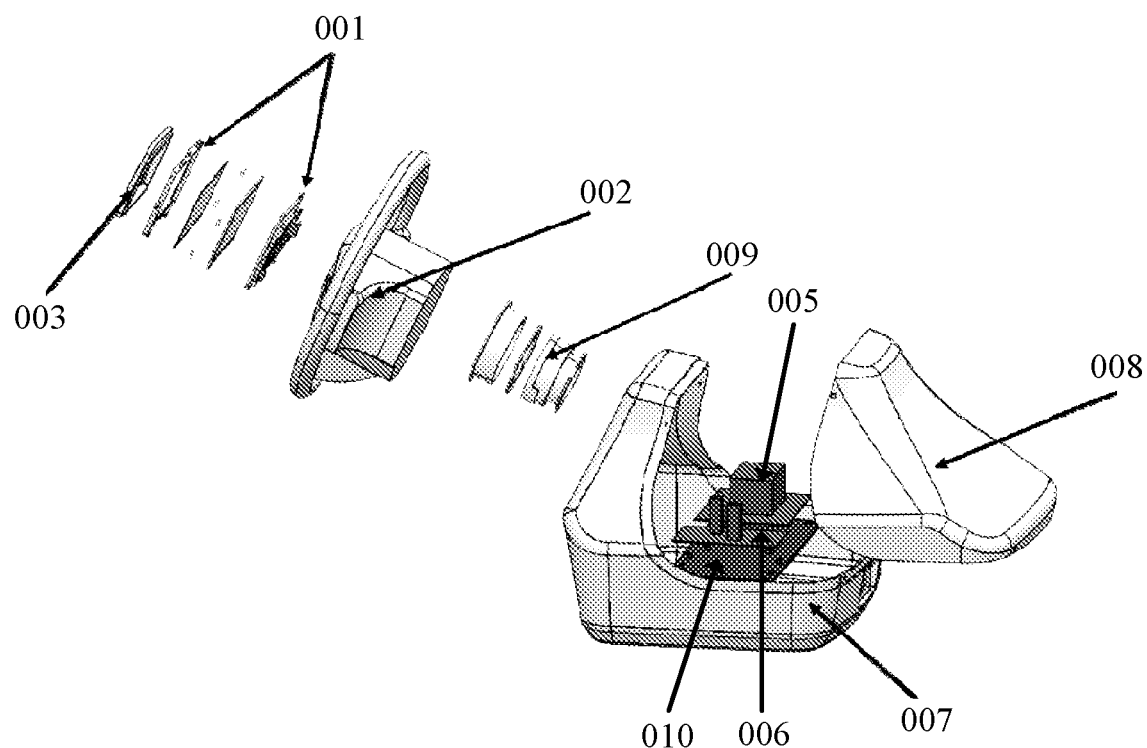
FIG. 5 is a schematic diagram of a virtual haptic system applied to a steering wheel provided by an embodiment of the disclosure.
Figure 6:
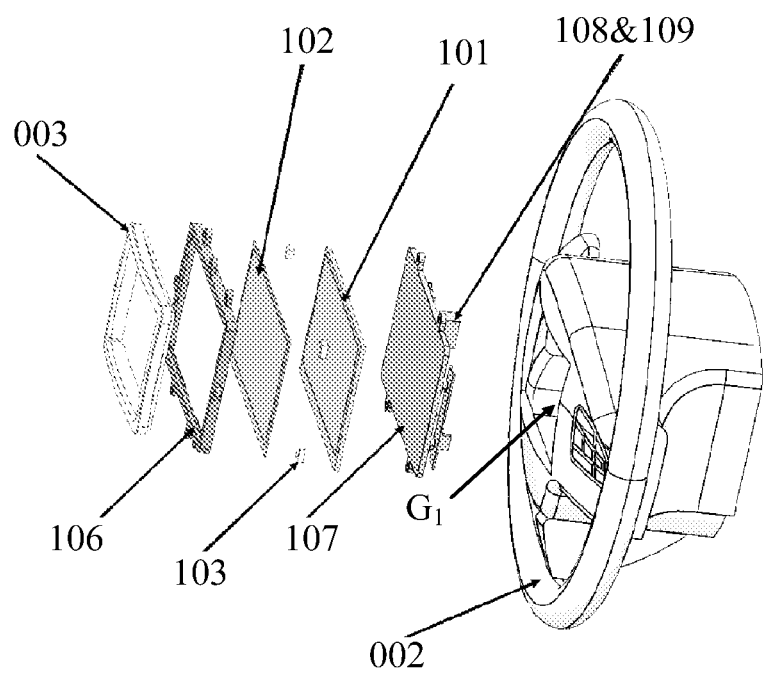
FIG. 6 is a partial enlarged view of the virtual haptic system shown in FIG. 5.
Figure 7:
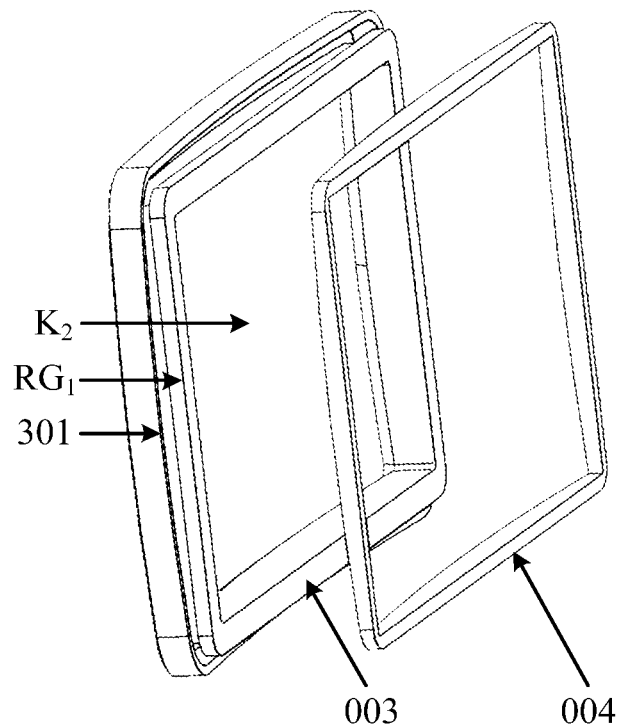
FIG. 7 is a schematic diagram of a first cover plate and a third cushion in the virtual haptic system shown in FIG. 5.

Optionally, as shown in FIG. 1, FIG. 5 and FIG. 6, an embodiment of the disclosure provides a virtual haptic system, including a virtual haptic assembly 001 and a steering wheel housing 002, where the virtual haptic assembly 001 is the above virtual haptic assembly 001 provided by the embodiment of the disclosure, and the virtual haptic assembly 001 is mounted in the steering wheel housing 002.

In some embodiments, in the above virtual haptic system provided by the embodiment of the disclosure, as shown in FIG. 1 and FIG. 6, a center of the steering wheel housing 002 has a first groove $G_1$, and the virtual haptic assembly 001 is embedded in the first groove $G_1$.

In some embodiments, the above virtual haptic system provided by the embodiment of the disclosure, as shown in FIG. 1 and FIG. 5 to FIG. 7, may further include a first cover plate 003 (such as a polyvinyl chloride (PVC) plate) and a third cushion 004 (such as a silica gel piece), where the first cover plate 003 includes a second hollowed-out structure $K_2$, a third body part 301 and a first annular groove $RG_1$, an orthographic projection of the second hollowed-out structure $K_2$ on the touch panel 1021 approximately coincides with the touch area AA (that is, it exactly coincides or is within an allowable range of errors caused by factors such as manufacturing and measurement), the third body part 301 encloses the second hollowed-out structure $K_2$ and is fixedly connected with the steering wheel housing 002, and the first annular groove $RG_1$ is located on a side surface of the third body part 301 away from the second hollowed-out structure $K_2$; and the third cushion 004 is embedded between the first annular groove $RG_1$ and the virtual haptic assembly 001, so as to avoid the restraint and influence of the first cover plate 003 on vibration of the actuator 102 in the virtual haptic assembly 001. The first cover plate 003 may play a role of decoration and protection.

Figure 8:
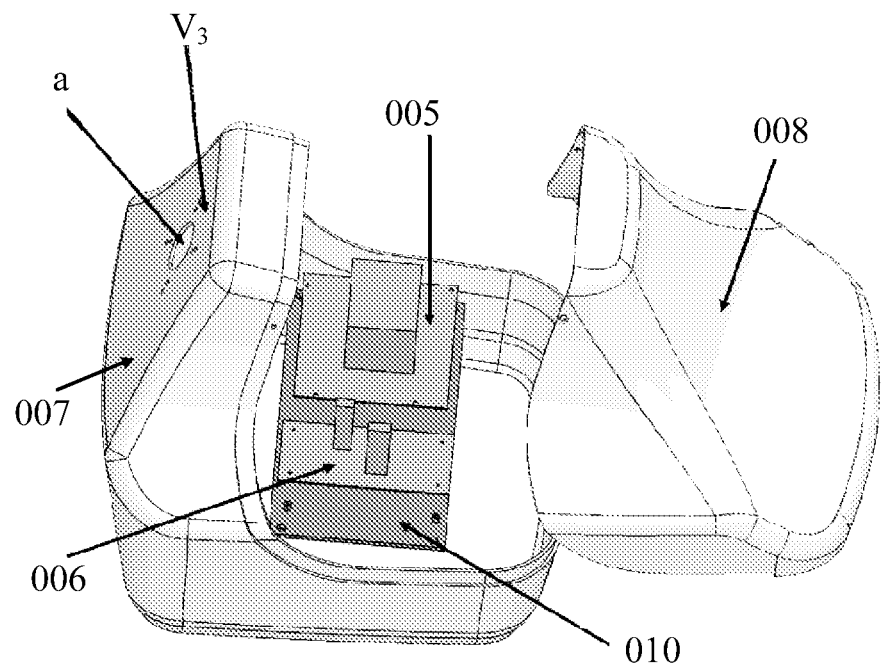
FIG. 8 is a schematic diagram of a first box body and a first box body cover plate in a virtual haptic system provided by an embodiment of the disclosure.

In some embodiments, the above virtual haptic system provided by the embodiment of the disclosure, as shown in FIG. 5 and FIG. 8, may further include a first main controller 005 (which may have a heat dissipation function) and a first power supply 006, a bottom of the first groove $G_1$ may include a first wiring through hole (not shown in the figure), and the first main controller 005 and the first power supply 006 are electrically connected with the virtual haptic assembly 001 through the first wiring through hole respectively.

In some embodiments, the above virtual haptic system provided by the embodiment of the disclosure, as shown in FIG. 5 and FIG. 8, may further include a box body 007 and a first box body upper cover 008 which are detachably connected, the first box body 007 includes a second wiring through hole a, the second wiring through hole a and the first wiring through hole (not shown in the figure) are connecting, a first accommodation space is formed between the first box body 007 and the first box body upper cover 008, the first main controller 005 and the first power supply 006 are arranged in the first accommodation space, so as to protect the first main controller 005 and the first power supply 006 through the first box body 007 and the first box body upper cover 008, and it is ensured that the virtual haptic system overall looks simple and orderly without clutter. Further, the first box body 007 and the first box body upper cover 008 may further be opened, so as to facilitate the mounting and maintenance of the internal first main controller 005, the first power supply 006 and other components.

Figure 9:
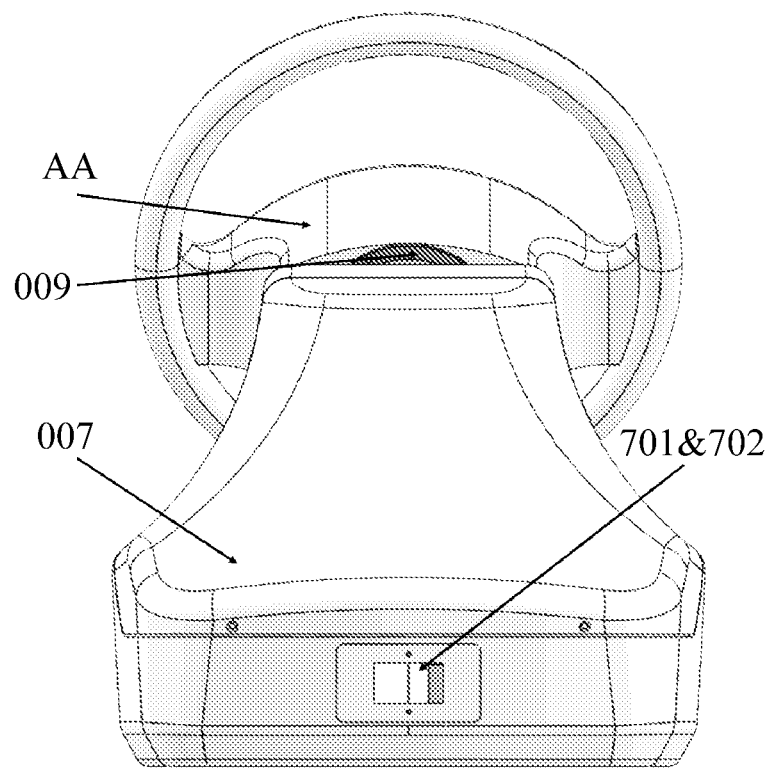
FIG. 9 is another schematic diagram of the virtual haptic system shown in FIG. 5.

In some embodiments, in the above virtual haptic system provided by the embodiment of the disclosure, as shown in FIG. 9, the first box body 007 may further includes a first power switch 701 and a first power interface 702, so that an external power supply can supply power to the virtual haptic system through the first power interface 702 in coordination with the first power switch 701.

Figure 10:
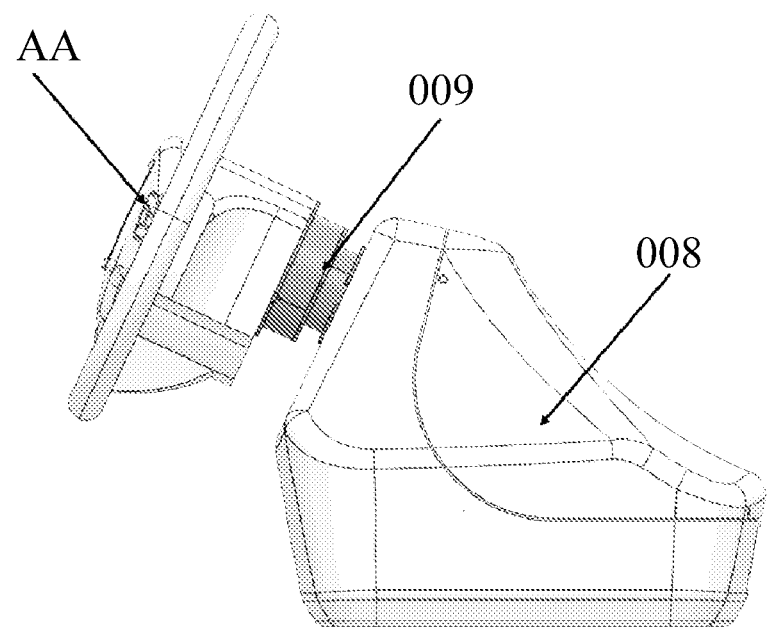
FIG. 10 is yet another schematic diagram of the virtual haptic system shown in FIG. 5.

In some embodiments, the above virtual haptic system provided by the embodiment of the disclosure, as shown in FIG. 5, FIG. 9 and FIG. 10, may further include a rotating shaft 009, the rotating shaft 009 is connected with the steering wheel housing 002 and the first box body 007. During operation of the user, the virtual haptic assembly 001 drives the rotating shaft 009 to rotate together, so as to generate an effect of steering wheel rotation.

Figure 11:
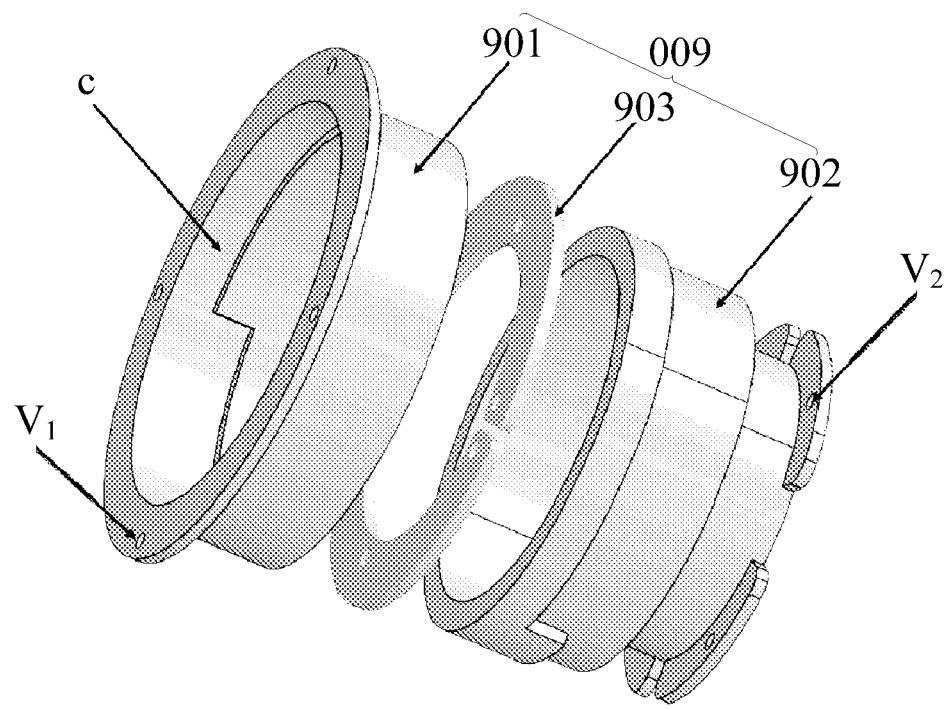
FIG. 11 is a schematic diagram of a rotating shaft in the virtual haptic system shown in FIG. 5.

In some embodiments, in the above virtual haptic system provided by the embodiment of the disclosure, as shown in FIG. 11, the rotating shaft 009 includes an upper rotating shaft 901, a lower rotating shaft 902, a mounting pad 903 and a third wiring through hole b, where the upper rotating shaft 901 may be fixedly connected with the steering wheel housing 002 through a first mounting hole $V_1$ therein, the lower rotating shaft 902 may be fixedly connected with a third mounting hole $V_3$ (as shown in FIG. 8) in the first box body 007 through a second mounting hole $V_2$ therein, the mounting pad 903 is located between the upper rotating shaft 901 and the lower rotating shaft 902, and the third wiring through hole b runs through the upper rotating shaft 901, the mounting pad 903 and the lower rotating shaft 902. Optionally, the third wiring through hole b is located at a center of the rotating shaft 009, the third wiring through hole b communicates with the first wiring through hole (not shown in the figure) and the second wiring through hole a, so that a power line and a signal communication line which run through the first wiring through hole (not shown in the figure), the second wiring through hole a and the third wiring through hole b may be arranged, and the virtual haptic assembly 001 is electrically connected with the first box body 007 through the power line and the signal communication line.

In some embodiments, the above virtual haptic system provided by the embodiment of the disclosure, as shown in FIG. 5 and FIG. 8, may further include a first counterweight 010, the first counterweight 010 is located in the first accommodation space enclosed by the first box body 007 and the first box body upper cover 008, and the first counterweight 010 is fixedly provided with the first main controller 005 and the first power supply 006. Since the lower rotating shaft 902 is mounted on the first box body 007, the first counterweight 010 located in the first box body 007 may keep the position of the lower rotating shaft 902 basically stationary. Optionally, the first counterweight 010 may further have a bottom heat dissipation element.

In some embodiments, in the above virtual haptic system provided by the embodiment of the disclosure, as shown in FIG. 12 to FIG. 15, the steering wheel housing 002 includes a rim 201, a spoke 202 and a hub 203, the hub 203 is arranged in the rim 201, the spoke 202 is fixedly connected between the hub 203 and the rim 201, a center of the hub 203 has the first groove $G_1$, and the virtual haptic assembly 001 is mounted in the first groove $G_1$.

Figure 12:
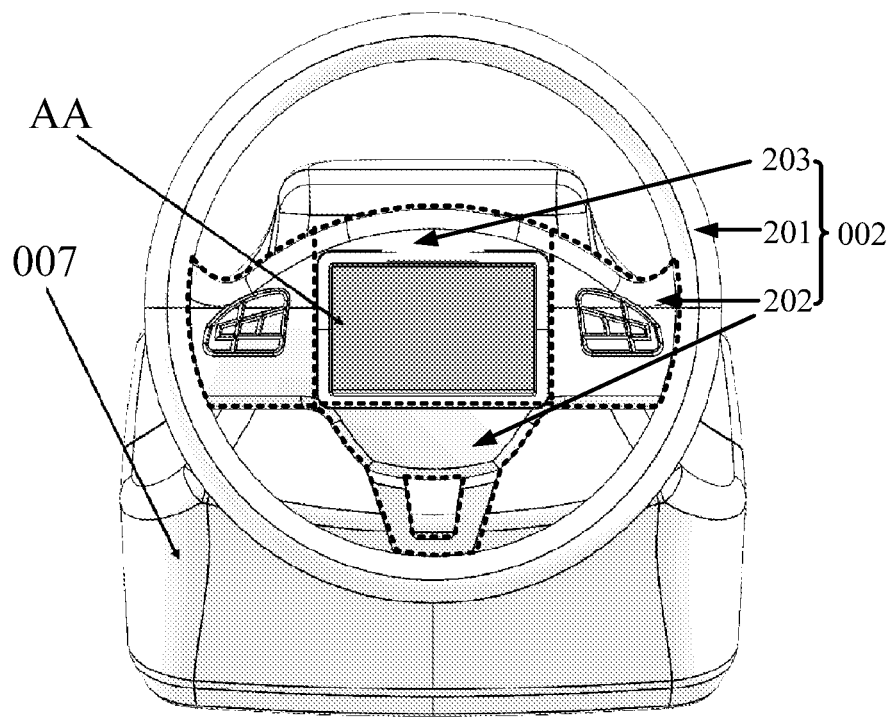
FIG. 12 is yet another schematic diagram of the virtual haptic system shown in FIG. 5.
Figure 13:
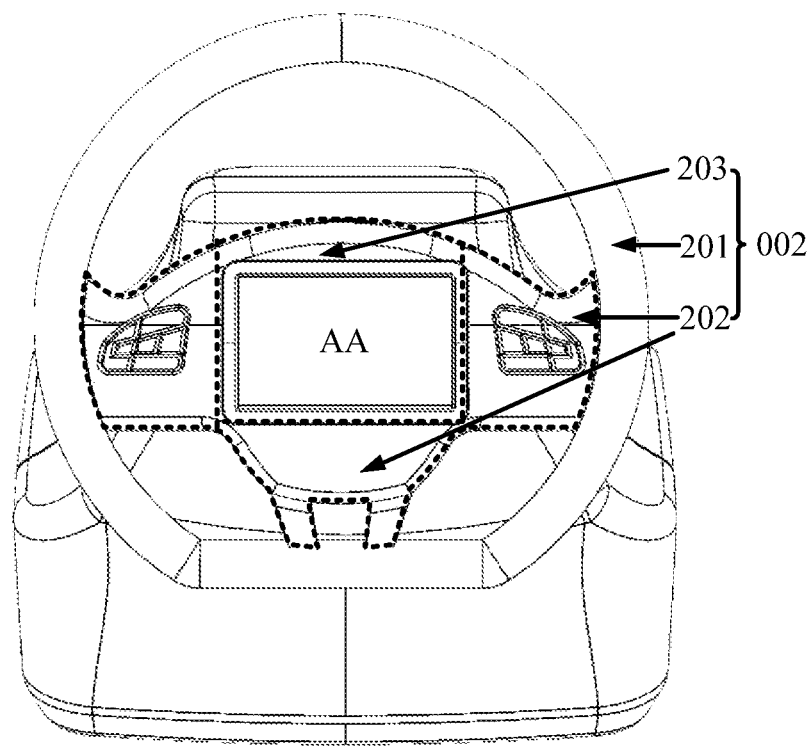
FIG. 13 is another schematic diagram of a virtual haptic system applied to a steering wheel provided by an embodiment of the disclosure.
Figure 14:
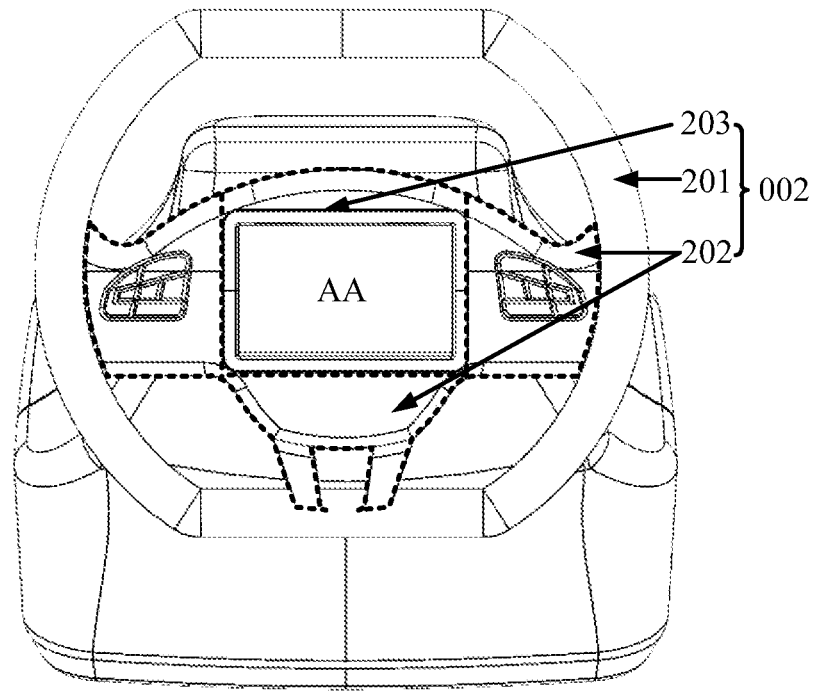
FIG. 14 is yet another schematic diagram of a virtual haptic system applied to a steering wheel provided by an embodiment of the disclosure.
Figure 15:
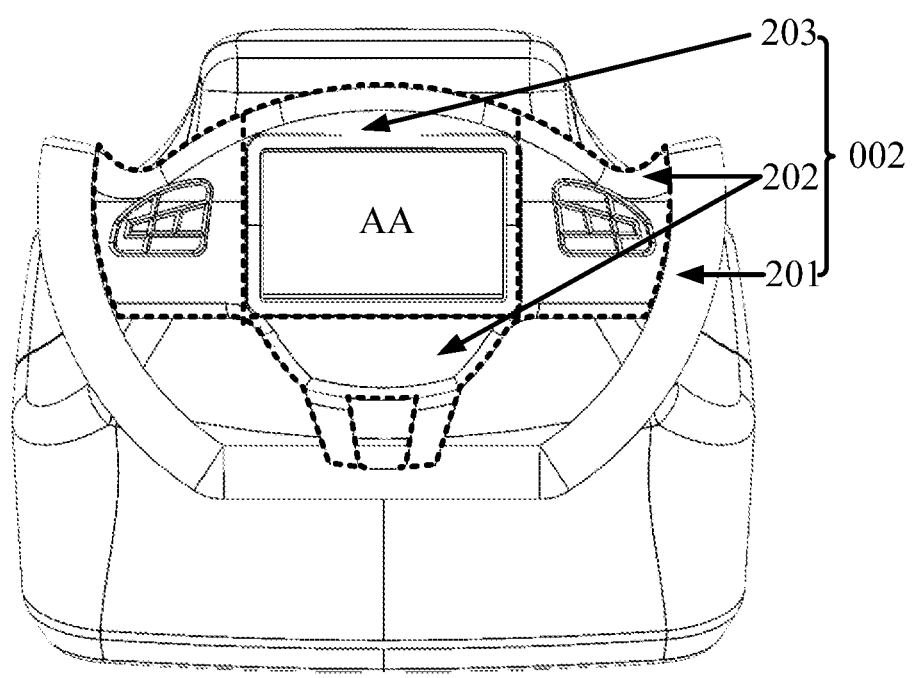
FIG. 15 is yet another schematic diagram of a virtual haptic system applied to a steering wheel provided by an embodiment of the disclosure.

In some embodiments, in the above virtual haptic system provided by the embodiment of the disclosure, as shown in FIG. 12 to FIG. 14, the shape of the rim 201 may be an annulus. Exemplarily, as shown in FIG. 12, the annulus is a circular ring, and in this case, the rim 201 is in a conventional shape; as shown in FIG. 13, the annulus may further be formed by connecting a line segment and a major arc end to end, and in this case, the rim 201 is trimmed on a single side; or, as shown in FIG. 14, the annulus is formed by two line segments and two minor arcs, and the line segments and the minor arcs are connected alternately, so that the rim 201 is trimmed on upper and lower sides. Optionally, as shown in FIG. 15, the shape of the rim 201 may further be a non-closed pattern, exemplarily, the non-closed pattern is formed by a line segment and two minor arcs, and the line segment is connected between the two minor arcs.

In another aspect, an embodiment of the disclosure further provides a virtual haptic system, applied in a non-steering wheel scene (such as a smart home scene). The virtual haptic system may include the above virtual haptic assembly provided by the embodiment of the disclosure.

In some embodiments, the above virtual haptic system provided by the embodiment of the disclosure, as shown in FIG. 2, may further include a housing 011, the housing 011 includes a second groove $G_2$, and the virtual haptic assembly 001 is embedded in the second groove $G_2$.

Figure 16:
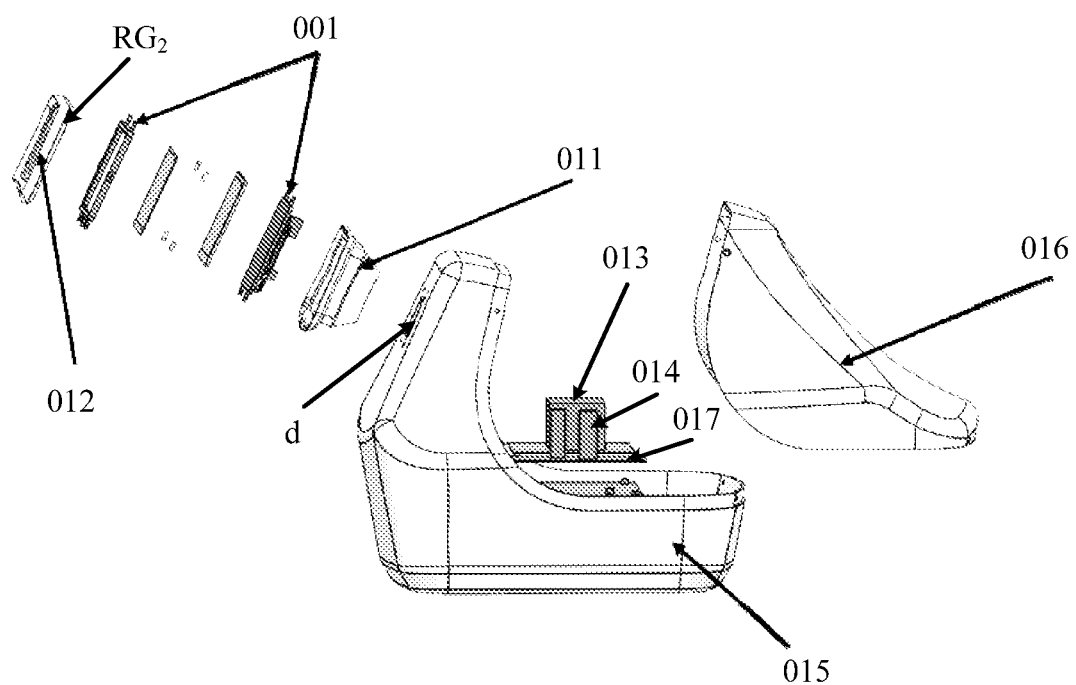
FIG. 16 is a schematic diagram of a virtual haptic system applied to a non-steering wheel provided by an embodiment of the disclosure.

In some embodiments, the above virtual haptic system provided by the embodiment of the disclosure, as shown in FIG. 2 and FIG. 16, may further include a second cover plate 012 (such as a polyvinyl chloride (PVC) plate) and a fourth cushion (not shown in the figure, such as a silica gel piece), where the second cover plate 012 includes a third hollowed-out structure $K_3$, a fourth body part 1201 and a second annular groove $RG_2$, an orthographic projection of the third hollowed-out structure $K_3$ on the touch panel 1021 approximately coincides with the touch area AA (that is, it exactly coincides or is within an allowable range of errors caused by factors such as manufacturing and measurement), the fourth body part 1201 encloses the third hollowed-out structure $K_3$ and is fixedly connected with the housing 011, and the second annular groove $RG_2$ is located on a side surface of the fourth body part 1201 away from the third hollowed-out structure $K_3$; and the fourth cushion (not shown in the figure) is embedded between the second annular groove $RG_2$ and the virtual haptic assembly 001, so as to avoid the restraint and influence of the second cover plate 012 on vibration of the actuator 102 in the virtual haptic assembly 001. In addition, the second cover plate 012 may play a role of decoration and protection.

In some embodiments, the above virtual haptic system provided by the embodiment of the disclosure, as shown in FIG. 16, may further include a second main controller 013 (which may have a heat dissipation function) and a second power supply 014, a bottom of the second groove $G_2$ includes a fourth wiring through hole c (as shown in FIG. 2), and the second main controller 013 and the second power supply 014 are electrically connected with the virtual haptic assembly 001 through the fourth wiring through hole c respectively.

Figure 17:
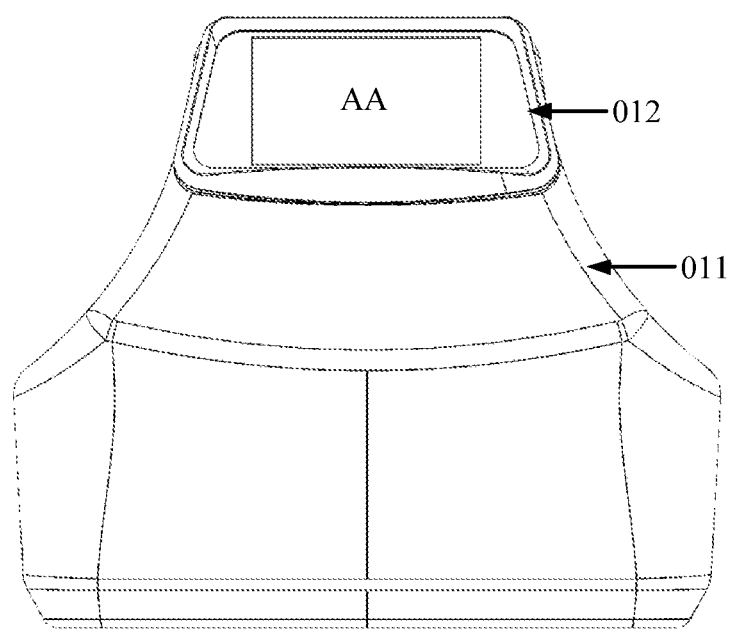
FIG. 17 is yet another schematic diagram of the virtual haptic system shown in FIG. 7.

In some embodiments, the above virtual haptic system provided by the embodiment of the disclosure, as shown in FIG. 16 and FIG. 17, may further include a second box body 015 and a second box body upper cover 016 which are detachably connected, where the second box body 015 is fixedly connected with the housing 011, and includes a fifth wiring through hole d, the fifth wiring through hole d and the fourth wiring through hole c are connecting, a second accommodation space is formed between the second box body 015 and the second box body upper cover 016, the second main controller 013 and the second power supply 014 are arranged in the second accommodation space, so as to protect the second main controller 013 and the second power supply 014 through the second box body 015 and the second box body upper cover 016, and it is ensured that the virtual haptic system overall looks simple and orderly without clutter. Further, the second box body 015 and the second box body upper cover 016 may further be opened, so as to facilitate the mounting and maintenance of the internal second main controller 013, the second power supply 014 and other components.

In some embodiments, in the above virtual haptic system provided by the embodiment of the disclosure, the second box body 015 may include a second power switch and a second power interface, so that an external power supply can supply power to the virtual haptic system through the second power interface in cooperation with the second power switch. The setting mode of the second power switch and the second power interface may refer to the setting mode of the first power switch and the first power interface shown in FIG. 9.

In some embodiments, the above virtual haptic system provided by the embodiment of the disclosure, as shown in FIG. 16, may further include a second counterweight 017, the second counterweight 017 may be located in the second accommodation space enclosed by the second box body 015 and the second box body upper cover 016, and the second counterweight 017 is fixedly provided with the second main controller 013 and the second power supply 014. Since the housing 011 is mounted on the second box body 015, the second counterweight 017 located in the second box body 015 may keep the position of the housing 011 basically stationary, so that it is ensured that the position of the virtual haptic assembly 001 mounted in the housing 011 is fixed. Optionally, the second counterweight 017 may further have a bottom heat dissipation element.

Based on the same inventive concept, an embodiment of the disclosure provides a driving method of the above virtual haptic system. Since the principle of solving the problem of the driving method is similar to that of the above virtual haptic system, the implementation of the driving method provided by the embodiment of the disclosure can refer to the implementation of the above virtual haptic system provided by the embodiment of the disclosure, and repetitions are omitted herein.

Figure 18:
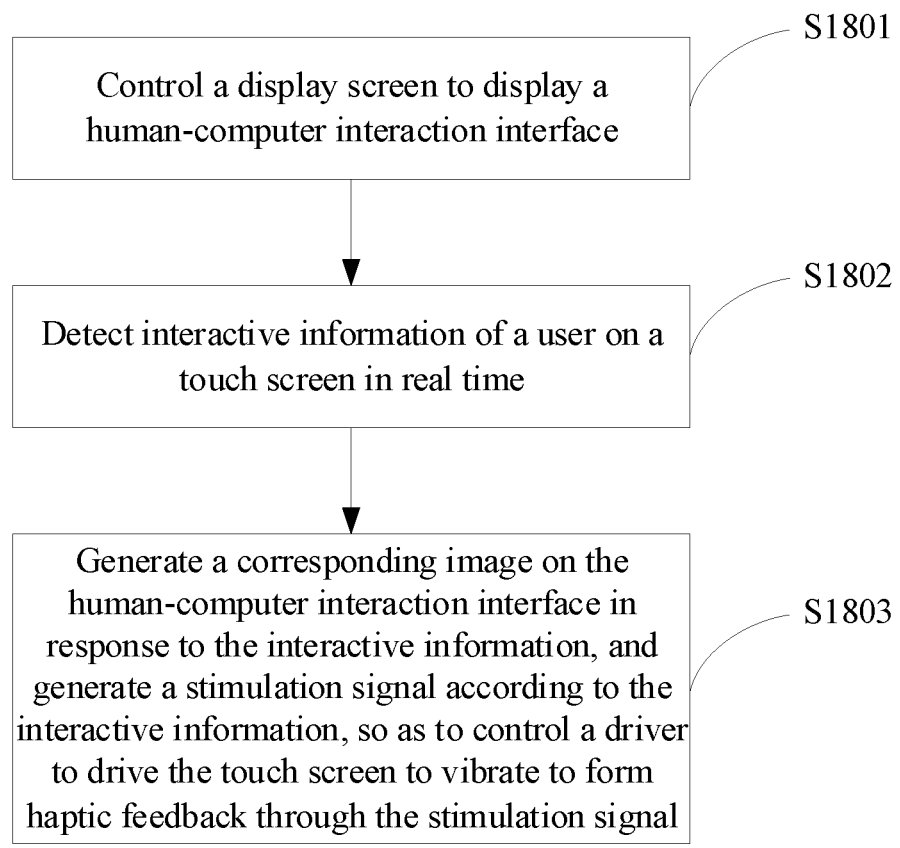
FIG. 18 is flow chart of a driving method of a virtual haptic system provided by an embodiment of the disclosure.

Specifically, an embodiment of the disclosure provides a driving method of the above virtual haptic system, as shown in FIG. 18, including the following steps.

S1801, controlling a display screen to display a human-computer interaction interface.

S1802, detecting interactive information from a user on a touch panel in real time.

S1803, generating a corresponding image on the human-computer interaction interface in response to the interactive information, and generating a stimulation signal according to the interactive information, to control a piezoelectric sensor to drive the touch panel to vibrate to form haptic feedback through the stimulation signal.

Figure 19:
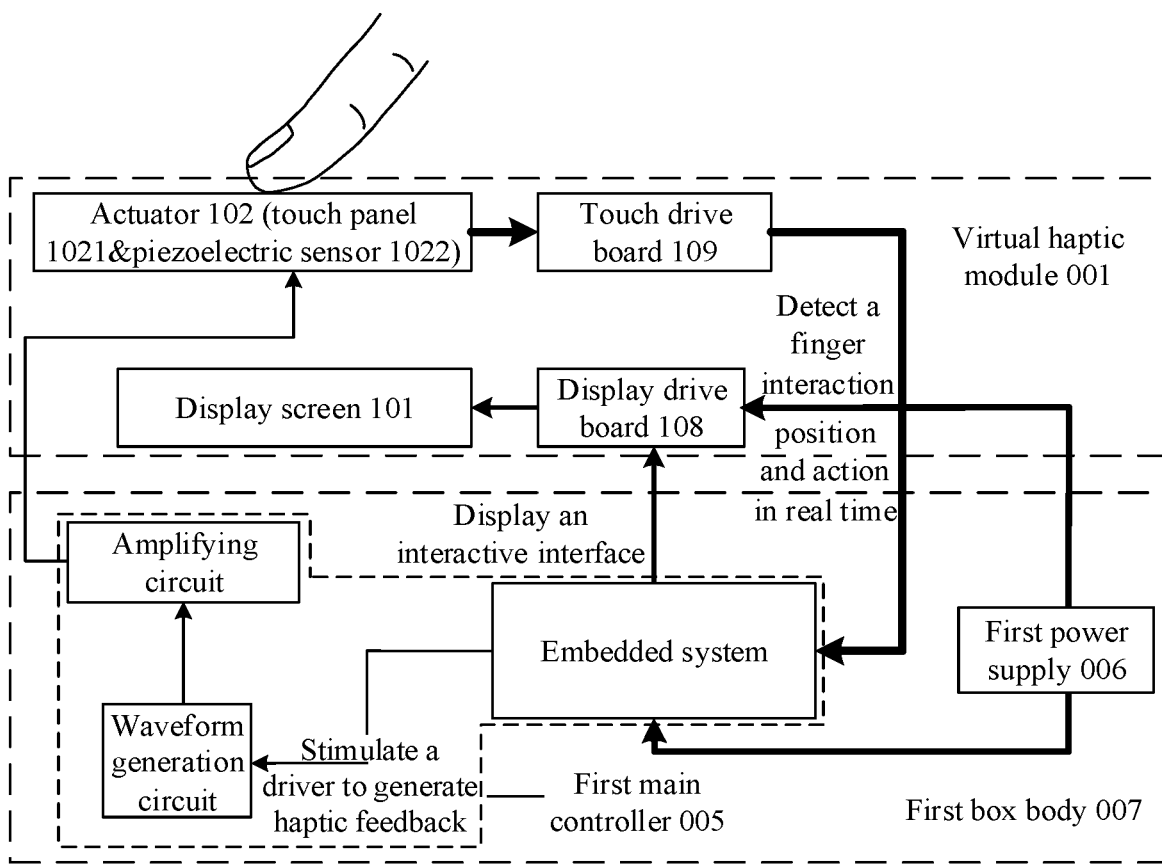
FIG. 19 is a block diagram of an operation structure of a virtual haptic system provided by an embodiment of the disclosure.

In some embodiments, as shown in FIG. 19, taking a situation that it is applied to a steering wheel as an example, the power supply of the entire virtual haptic system is controlled through the first power supply 006. After the first power switch 701 is started, the virtual haptic system automatically starts and runs to display the interactive interface on the display screen 101. An embedded system of the first main controller 005 detects the user's interactive information, such as interactive position and action on the touch panel 1021 in real time through the touch drive board 109, and enables the display drive board 108 to control the display screen 101 to generate corresponding response changes according to the interactive position and action of the user. A stimulation signal is generated through a waveform generation circuit and an amplifying circuit of the first main controller 005, the stimulation signal controls the piezoelectric sensor 1022 to drive the touch panel 1021 to vibrate, so as to generate surface or vibration haptic feedback, such as the edge sense of a key, the sense of pressing, the sense of smoothness of a knob, and the texture sense of a progress bar.

Apparently, those skilled in the art can make various modifications and variations to the embodiments of the disclosure without departing from the spirit and scope of the embodiments of the disclosure. In this way, under the condition that these modifications and variations to the embodiments of the disclosure fall within the scope of the claims of the disclosure and their equivalent technologies, the disclosure is also intended to include these modifications and variations.

What is claimed is:

1. A virtual haptic assembly, comprising:
a display screen;
an actuator on a light emitting side of the display screen; wherein the actuator comprises a touch panel different from the display screen and at least one piezoelectric sensor, and the touch panel comprises a touch area and a non-touch area arranged on at least one side of the touch area, the piezoelectric sensor is located on a side of the touch panel facing the display screen and located between the display screen and the touch panel, and the piezoelectric sensor is configured to drive the touch panel to vibrate to form haptic feedback in response to interactive information from a user; and
a first cushion, located on the light emitting side of the display screen and fixed between the display screen and the actuator, wherein an orthographic projection of the first cushion on the touch panel is located in the non-touch area.

2. The virtual haptic assembly according to claim 1, wherein the first cushion is disposed on a surface of each corner of the touch panel.

3. The virtual haptic assembly according to claim 2, wherein the touch panel is a polygon;
the first cushion has a fixed shape, and the first cushion is arranged symmetrically with respect to a center of the touch panel.

4. The virtual haptic assembly according to claim 3, wherein the fixed shape is an L shape, a rectangle or a triangle.

5. The virtual haptic assembly according to claim 1, wherein the first cushion is arranged enclosing the touch area.

6. The virtual haptic assembly according to claim 1, wherein an orthographic projection of the piezoelectric sensor on the touch panel is located in the touch area.

7. The virtual haptic assembly according to claim 6, wherein the piezoelectric sensor is arranged all over the touch area.

8. The virtual haptic assembly according to claim 1, wherein an orthographic projection of the piezoelectric sensor on the touch panel is located in the non-touch area.

9. The virtual haptic assembly according to claim 8, wherein a plurality of piezoelectric sensors are provided and divided into at least one group, and each piezoelectric sensor in a same group is arranged in the non-touch area at a same side of the touch area.

10. The virtual haptic assembly according to claim 9, wherein the piezoelectric sensors form one group, and the piezoelectric sensors in the group are arranged in the non-touch area at one side of the touch area.

11. The virtual haptic assembly according to claim 10, wherein the piezoelectric sensors are divided into two groups, and the piezoelectric sensors in the two groups are arranged in the non-touch areas at two sides of the touch area respectively.

12. The virtual haptic assembly according to claim 9, further comprising: a first wire and a second wire, wherein the first wire and the second wire are located at a side of the piezoelectric sensors facing the display screen;
the first wire is connected with a first electrode of each piezoelectric sensor in the same group, and the first wire is not in contact with the piezoelectric sensors at positions other than connection points with the piezoelectric sensors; and
the second wire is connected with a second electrode of each piezoelectric sensor in the same group, and the second wire is not in contact with the piezoelectric sensors at positions other than connection points with the piezoelectric sensors.

13. The virtual haptic assembly according to claim 12, wherein between the connection points of two adjacent piezoelectric sensors in the same group, the first wire extends obliquely towards a position between two connection points, and extends in parallel to an arrangement direction of the piezoelectric sensors.

14. The virtual haptic assembly according to claim 1, further comprising: an assembly cover plate, wherein the assembly cover plate is located on a side of the actuator away from the display screen; and
the assembly cover plate comprises a first hollowed-out structure, and an orthographic projection of the first hollowed-out structure on the touch panel approximately coincides with the touch area.

15. The virtual haptic assembly according to claim 14, further comprising: a second cushion, wherein the second cushion is fixed between the assembly cover plate and the touch panel, and an orthographic projection of the second cushion on the touch panel is located in the non-touch area.

16. The virtual haptic assembly according to claim 14, further comprising an assembly mounting bottom plate, wherein the assembly mounting bottom plate is located on a side of the display screen away from the actuator;
the assembly mounting bottom plate comprises a first body part and a plurality of first protruding parts located on a side surface of the first body part, wherein an orthographic projection of the first body part on the touch panel approximately coincides with the touch panel, and orthographic projections of the plurality of first protruding parts on the touch panel do not overlap the touch panel; and
the assembly cover plate comprises a second body part and a plurality of second protruding parts located on a side surface of the second body part, wherein an orthographic projection of the second body part on the touch panel approximately coincides with the non-touch area, and the second protruding parts are fixedly connected with the first protruding parts.

17. The virtual haptic assembly according to claim 16, further comprising: a display drive board and a touch drive board, wherein
the display drive board and the touch drive board are located on a side of the assembly mounting bottom plate away from the display screen;
the display drive board is electrically connected with the display screen; and
the touch drive board is electrically connected with the actuator.

18. A virtual haptic system, applied to a vehicle, and comprising a steering wheel housing and a virtual haptic assembly, wherein the virtual haptic assembly is mounted in the steering wheel housing;
wherein the virtual haptic assembly comprises:
a display screen;
an actuator on a light emitting side of the display screen; wherein the actuator comprises a touch panel different from the display screen and at least one piezoelectric sensor, and the touch panel comprises a touch area and a non-touch area arranged on at least one side of the touch area, the piezoelectric sensor is located on a side of the touch panel facing the display screen and located between the display screen and the touch panel, and the piezoelectric sensor is configured to drive the touch panel to vibrate to form haptic feedback in response to interactive information from a user; and
a first cushion, located on the light emitting side of the display screen and fixed between the display screen and the actuator, wherein an orthographic projection of the first cushion on the touch panel is located in the non-touch area.

19. The virtual haptic system according to claim 18, wherein a center of the steering wheel housing has a first groove, and the virtual haptic assembly is embedded in the first groove.

20. A virtual haptic system, comprising a virtual haptic assembly, wherein the virtual haptic assembly comprises:
a display screen;
an actuator on a light emitting side of the display screen; wherein the actuator comprises a touch panel different from the display screen and at least one piezoelectric sensor, and the touch panel comprises a touch area and a non-touch area arranged on at least one side of the touch area, the piezoelectric sensor is located on a side of the touch panel facing the display screen and located between the display screen and the touch panel, and the piezoelectric sensor is configured to drive the touch panel to vibrate to form haptic feedback in response to interactive information from a user; and
a first cushion, located on the light emitting side of the display screen and fixed between the display screen and the actuator, wherein an orthographic projection of the first cushion on the touch panel is located in the non-touch area.

\* \* \* \* \*